(12) United States Patent
Mackie, Jr.

(10) Patent No.: US 11,535,736 B2
(45) Date of Patent: Dec. 27, 2022

(54) INJECTION MOLDING AND MOLDING COMPOSITIONS THEREFORE

(71) Applicant: Emily Mackie, Chicago, IL (US)

(72) Inventor: Thomas Sterling Mackie, Jr., Chicago, IL (US)

( * ) Notice: Subject to any disclaimer, the term of this patent is extended or adjusted under 35 U.S.C. 154(b) by 129 days.

(21) Appl. No.: 17/138,804

(22) Filed: Dec. 30, 2020

(65) Prior Publication Data

US 2022/0204740 A1 Jun. 30, 2022

(51) Int. Cl.
*C08L 23/16* (2006.01)
*C08L 23/06* (2006.01)
*C08L 23/12* (2006.01)
*C08J 11/06* (2006.01)

(52) U.S. Cl.
CPC ............... *C08L 23/16* (2013.01); *C08J 11/06* (2013.01); *C08L 23/06* (2013.01); *C08L 23/12* (2013.01); *C08J 2323/16* (2013.01); *C08J 2423/06* (2013.01); *C08J 2423/12* (2013.01); C08L 2205/035 (2013.01); C08L 2207/062 (2013.01); C08L 2207/24 (2013.01)

(58) Field of Classification Search
CPC .......... C08L 23/06; C08L 23/12; C08L 23/16; C08L 2207/062; C08L 2207/24; C08L 2205/035; C08J 11/06; C08J 2423/06; C08J 2423/12; C08J 2323/16
See application file for complete search history.

(56) References Cited

U.S. PATENT DOCUMENTS 5,886,078 A * 3/1999 Sullivan ................ B29B 7/7495
524/449
2009/0308009 A1* 12/2009 Boor ........................ C08L 23/10
52/309.13

* cited by examiner

*Primary Examiner* — Edward J Cain
(74) *Attorney, Agent, or Firm* — James A. Italia; Italia IP

(57) ABSTRACT

A method of combining rubbers and plastics when injection molding, and compositions usable in injection molding, are shown and described. Comminuted rubber from waste tires and waste plastics including any of high density polyethylene, polyethylene terephthalate, and polypropylene are combined and heated to melt at least the plastics. In one optional approach, both are melted. Plastics comprise from twenty to eighty percent by weight of the mixture, with rubber accounting for the balance. The mixture may be fortified with bonding, compatibilizing, and strengthening agents. The compositions may be cooled and pelletized for immediate use in injection operations.

9 Claims, 2 Drawing Sheets

INJECTION MOLDING AND MOLDING COMPOSITIONS THEREFORE

FIELD OF THE INVENTION

The present invention relates to injection molding using recycled rubber and plastic materials, and more particularly, to a method of injection molding and to pelletizable compositions for injection molding materials.

BACKGROUND OF THE INVENTION

Recycling has been a topic of discussion, the subject of many conversations, the creation of many programs and many strategic efforts for quite some time. The benefits of recycling certain commercial products are well known. For example, the recycling of paper, plastic, glass bottles and aluminum cans has become customary in our everyday world.

However, there some materials which are not currently being recycled in a sensible manner One example is that of rubber tires. The benefits of reusing general waste tire scrap are obvious. It diverts millions of tires from the solid waste stream. It saves energy and resources. It avoids new or additional toxic manufacturing inputs.

Scrap tires form a significant part of the world's solid waste management problem. In recent years, the waste tire problem has become so acute that there is an urgent need to find an optimum and effective way to use scrap tires. Massive disposal sites of scrap tires is common in many cities of modern times as about 1 scrap tire is produced per person every year. Stored outdoors, used tires slowly degrade under the effects of solar radiation as well as rusting of steel components of tires takes place. Degraded material will slowly contaminate soil and underground water over years.

Chemical composition tests on waste rubber show that it contains numerous toxic and hazardous air pollutants and once burned, these can become airborne. It is highly inaccurate to state that tire derived fuel (TDF) does not contain hazardous materials. Tires are manufactured from petrochemical feedstocks such as styrene and butadiene, which are both classified as human carcinogens.

Styrene is a benzene derivative, and burning tires releases styrene and several benzene compounds. Butadiene is a highly carcinogenic four-carbon compound that may also be released from the styrene-butadiene rubber (SBR) polymer form during combustion.

The current processes of dealing with waste tires, largely relying on incineration, have been met with resistance in that incineration itself is not compatible with the environment.

SUMMARY OF THE INVENTION

The present invention proposes to generate a thermoplastic elastomer composite resin made from waste plastic combined with waste tire rubber, and a process for manufacturing the same. Thus, these waste forms are used as constituent materials in injection molding new products, rather than being subjected to destruction by combustion. More specifically, the present invention contemplates a thermoplastic elastomer made from 80-20% waste plastics flakes and 20-80% waste rubber, suitable for use in injection molding, which thermoplastic elastomer possesses physical properties similar to or greater than high density polyethylene (HDPE).

The resulting thermoplastic elastomer will need to have physical properties such as melt flow, tensile strength, compressive strength, and notched izod impact strength, as well as others, making this composite resin a desirable injection grade material.

For achieving the aforementioned object, a method for producing a thermoplastic elastomer material of waste plastics and waste rubber according to the present invention comprises mixing rubber tire waste particles at a fine mesh and plastics waste flakes obtained by crushing molded polyethylene or polypropylene waste, and heating the mixture to melt at least waste plastic particles. The mixture may be improved by incorporating bonding, compatibilizing and strengthening agents. The mixture is then injected into a mold.

The rubber tire waste particles may be obtained by shredding and crushing rubbers into particles of a fine mesh, during which time the metals and fluff contained therein are removed.

Where the invention is practiced as pellets of resultant thermoplastic elastomer material, this material may be charged into the material supply hopper of a pelletizing machine. The material moves into the pelletizing machine while maintaining its uniformed mixed state along the inclined surface of the hopper.

Once in the injection molding machine the material is heated up to or above a melting point of the plastic particles. In some embodiments the rubber tire waste particles will not be melted, rather being pressed with the rubber component retaining its discrete form, and injected into a mold through a conventional nozzle. The now molded material is then removed from the mold to provide a finished or partially finished product.

Pellets may be produced by this method in either one of two variations. In one variation, both the rubber and the plastic components are melted. In the other variation, only the plastic components are melted.

The finished product possesses physical properties such as desired density, tensile strength, impact resistance, compression strength, and melt flow, in producing finished products of similar of greater utility than products using 100% plastic.

The method and products presented herein address two problems. One is that of waste disposal, as both used rubber tires and consumer plastic materials are utilized. The other problem is that of providing new molding material without obliging manufacturers to utilize additional resources such as petroleum and natural gas. Recycling may be further exploited in using waste fly ash as a strengthening agent in the new molding material.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
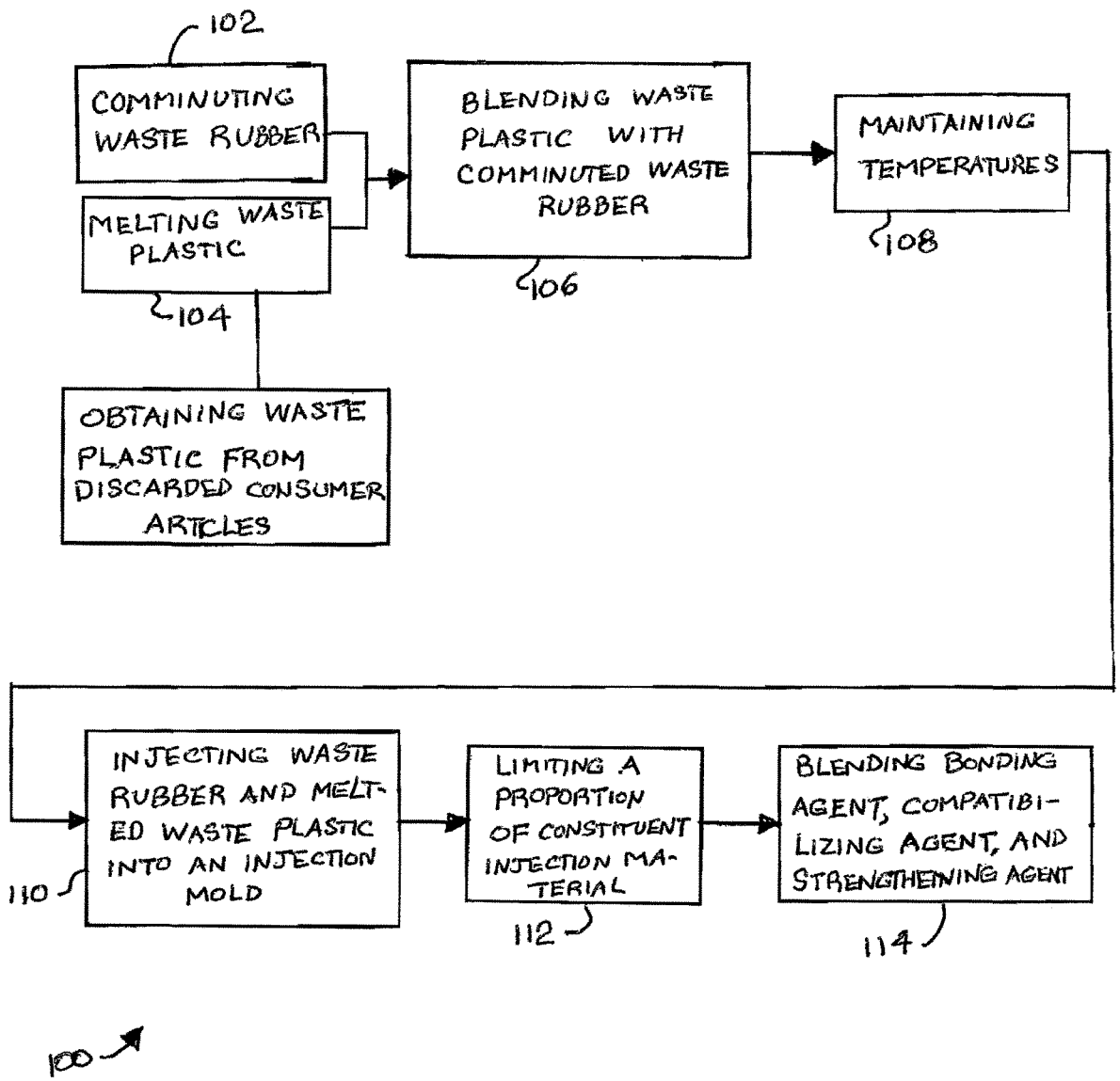
FIG. 1 is a block diagram showing steps of a method of injection molding, the steps shown in abbreviated form.
Figure 2:
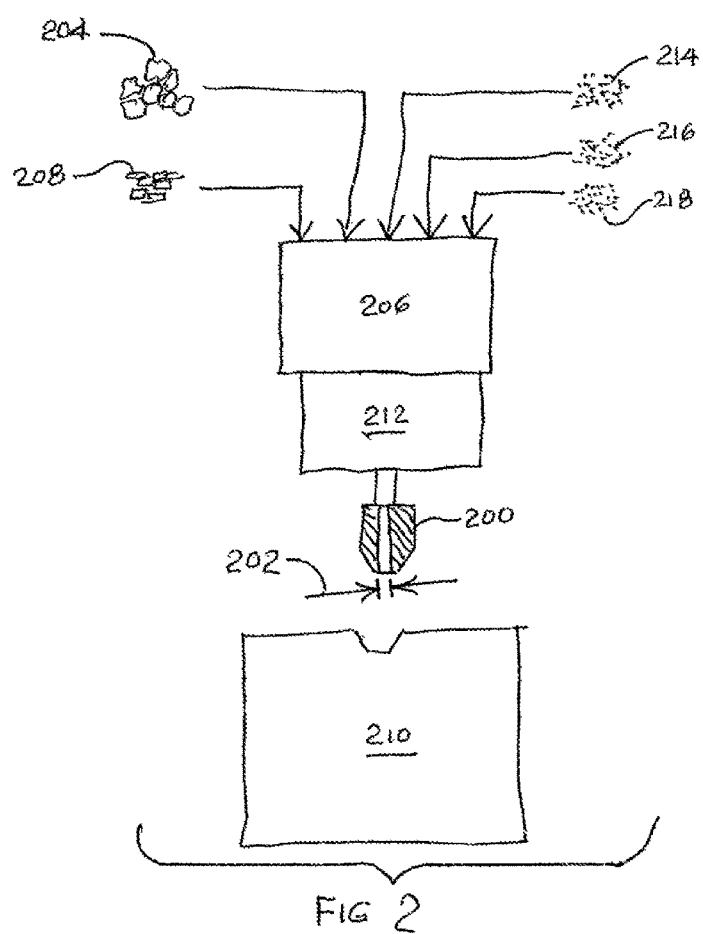
FIG. 2 is an exploded schematic rendition of materials and apparatus used in injection molding, according to at least one aspect of the invention.

FIG. 1 shows steps of a method 100 of injection molding. FIG. 2 shows materials and apparatus used in method 100 and to produce pelletized injection material. Steps of method 100 use 100-series reference numerals, and are shown in abbreviated form in FIG. 1. Apparatus and materials use 200-series reference numerals and are shown in FIG. 2. According to at least one aspect of the invention, there is shown a method 100 of injection molding, using an injection nozzle 200 (FIG. 2) having an orifice transverse dimension 202, and using a constituent injection material comprising rubber particles 204 and a plastic matrix material made from waste plastic 208. Method 100 may comprise a step 102 of comminuting waste rubber 204 having a melting point temperature into particles of dimensions sufficiently small to pass through injection nozzle 200, a step 104 of melting waste plastic 208 comprising at least one of high density polyethylene, polyethylene terephthalate, and polypropylene, a step 106 of blending waste plastic 208 (after blending, waste plastic matrix material 208) with the comminuted waste rubber 204, a step 108 of maintaining temperatures greater than a maximum melting point temperature of waste plastic 208 and lower than the minimum melting point temperature of waste rubber 204. Thus waste rubber 204 remains in a solid state. Method 100 includes a step 110 of injecting blended waste rubber 204 and melted waste plastic 208 into an injection mold 210. Molding apparatus includes injection nozzle 200 and a heater 212 to melt waste plastic 208 or to maintain waste plastic 208 in a melted condition.

Method 100 may further comprise a step 112 of limiting a proportion of the constituent injection material to waste rubber 204 in a range of twenty to eighty percent by weight, with a remainder of the constituent injection material being waste plastic 208.

It will be appreciated that constituent materials including at least waste rubber particles 204, waste plastic 208, bonding agent 214, compatibilitizing agent 216, and strengthening agent 218 are initially received in a processor 206 to prepare a functional injectable mixture for injection into injection mold 210. Apparatus for handling the functional injectable mixture and its precursors may be conventional, and therefore will not be described in greater detail. This apparatus is shown in schematic form only in the Drawing FIGS.

Preferably, the constituent injection material includes certain additives to improve performance. Method 100 may further comprise a step 114 of blending a bonding agent 214, a compatibilizing agent 216, and a strengthening agent 218 with the constituent injection material. Step 114 may be modified such that strengthening agent comprises majority fly ash. More particularly, step 114 may be modified such that the fly ash is type F fly ash meeting ASTM standard C618 (mainly consisted of $SiO_2$ (51.4%), $Al_2O_3$ (22.4%), and $Fe_2O_3$ (10.86%), with a total percentage over 70%).

Step 102 of comminuting waste rubber may be modified such that waste rubber 204 comprises wheeled transport vehicle tire waste and ethylene propylene terpolymer rubber.

Method 100 may further comprise a step 116 of obtaining waste plastic 208 from discarded consumer articles (not shown), and comminuting the discarded consumer articles.

The invention may also be thought of as a composition for providing pellets of constituent injection material fabricated from recycled products, the pellets being immediately usable in injection molding apparatus. Two generally similar compositions are proposed, noting that there exists a difference between the two.

Figure 3:
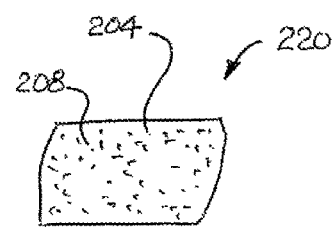
FIG. 3 is a schematic cross sectional view of one type of pellet, according to at least a further aspect of the invention.
Figure 4:
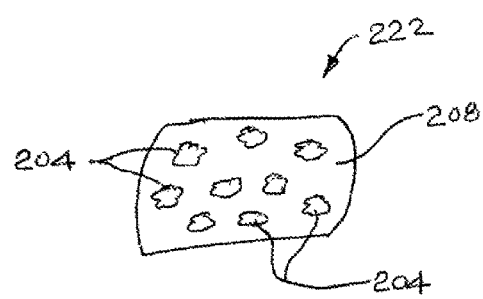
FIG. 4 is a schematic cross sectional view of another type of pellet, according to still another aspect of the invention.

Conventional pellet forming apparatus may be employed to heat and mix ingredients, and to extrude, cool, and pelletize the mixed ingredients. This conventional pellet forming apparatus is not shown. Resultant pellets are shown in FIG. 3 (showing pellets according to a first option) and 4 (showing pellets according to a second option).

In the first option, a composition for a pellet 220 of a constituent injection material comprises rubber particles 204 and a plastic matrix material 208. The composition comprises waste rubber particles 204 and waste plastic 208 comprising at least one of high density polyethylene, polyethylene terephthalate, and polypropylene, wherein waste rubber particles 204 and waste plastic 208 have been melted and blended, cooled, and formed into pellets 220.

In the first option, a proportion of waste rubber 204 in the constituent injection material is in a range of twenty to eighty percent by weight, with a remainder of the constituent injection material being waste plastic 208.

In the first option, the composition may further comprise bonding agent 214, compatibilizing agent 216, and strengthening agent 218 with the constituent injection material. Strengthening agent 218 may comprise majority fly ash, wherein the fly ash is type F fly ash meeting American Society for Testing and Materials (ASTM) standard C618.

Bonding agents and compatibilizing agents are known in the art of combining rubbers and plastics. Hence any known such agents may be employed. Known strengthening agents could be employed. Known strengthening agents may include $ZnO$, $TiO_2$, and $CaO$. However, it is preferred to use fly ash to provide ceramics (e.g., metal oxides), which ceramics may include silica ($SiO_2$), alumina ($Al_2O_3$), and iron (III) oxide $Fe_2O_3$).

In the first option, waste rubber 204 may comprise wheeled transport vehicle tire waste and ethylene propylene terpolymer rubber. Waste plastic 218 may be obtained from discarded consumer articles, and is comminuted.

In the first option, waste rubber 204 and waste plastic 208 are both melted and blended to the point that the constituent injection material, apart from additives, is homogeneous. In the second option, waste rubber 204 is not melted. In the final pelletized product, discrete particles of waste rubber will be discernible and although entrained within waste plastic matrix material 208, remain apart therefrom.

To this end, in the second option, a composition for a pellet 222 of a constituent injection material comprising rubber particles 204 and plastic matrix material 208 may comprise waste rubber particles 204 having a melting point temperature, and waste plastic 208 comprising at least one of high density polyethylene, polyethylene terephthalate, and polypropylene. Waste rubber 204 is blended with and encapsulated within waste plastic 208. Waste plastic 208 has been melted to blend with and encapsulate waste rubber particles 204, cooled, and formed into pellets 222.

In the composition producing pellets 222, melting temperatures have been maintained above a maximum melting point temperature of waste plastic 208 and below the melting point temperature of waste rubber particles 204. Waste rubber 204 remains within waste plastic 208 as discrete particles encapsulated in plastic matrix material 208.

In the composition producing pellets 222, a proportion of waste rubber 204 within the constituent injection material is in a range of twenty to eighty percent by weight, with a remainder of the constituent injection material being waste plastic 208.

The composition producing pellets 222 may further comprise a bonding agent, a compatibilizing agent, and a strengthening agent with the constituent injection material. The same agents used to produce pellets 220 may be employed to produce pellets 222.

In the composition producing pellets 222, the strengthening agent may comprise majority fly ash, wherein the fly ash is type F fly ash meeting ASTM standard C618.

In the composition producing pellets 222, waste rubber 204 may comprise wheeled transport vehicle tire waste and ethylene propylene terpolymer rubber, and waste plastic 208 may be obtained from discarded consumer articles, and is comminuted.

Formulations which have been practiced are shown in tables 1 and 2 below.

TABLE 1

Exemplary Formulation

| | |
|---|---|
| Scrap - (ground or pulverized rubber tire buffings), or (comminuted black ethylene propylene diene monomer rubber, a synthetic M-Class rubber via sulfur vulcanization under ASTM standard D-1418) | 46% |
| Scrap - (ground black or colored high-density polyethylene (HDPE/PEAD), a thermoplastic chemical formula generalized as $(C_2H_4)n$), or (ground black or colored low-density polyiethylene (LDPE/PEBD), a thermoplastic made from monomer ethylene $(C_2H_4)$. | 46% |
| Silicon dioxide | 2% |
| Cinnamic acid $(C_9H_8)x$ | 0.05% |
| Alumina $(Al_2O_3)$ | 2% |

TABLE 2

Exemplary Formulation

| | |
|---|---|
| Rubber (EPDM & tire): | 48% |
| Plastic (HDPE, PET & PP): | 48% |
| Bonding agent | 01% |
| Compatibilizing agent | 01% |
| Fly Ash (Type F): | 01% |

In Tables 1 and 2, where ingredients do not add up to 100%, ingredient quantities may be adjusted to add up to 100%.

Rubber buffing made from 100% recycled rubber. Rubber buffings having maximum dimensions of 1 mm to 7 mm may be used.

Carbon black (having mass of 12.011 g/mol.), having at least 97% elemental carbon arranged as acini-form carbon particulate, as a coloring agent for non-black materials, quantity as necessary for color control.

Processing aids, lubricating, and homogenizing agents can be added to enhance bonding and mold release characteristics.

Most of the powders used as strengthening agents are metal oxides and their use has long before proved beneficial in rubber tire manufacturing as there are ZnO, TiO2, CaO, The mechanical static properties are modified by adding the powders and the effect primarily depends on the strength of the organic-inorganic interface, thus on the composition, specific surface area and surface charge of the powder, along with the processing parameters: temperature, duration, etc.

ZnO is the formula for zinc oxide, an inorganic compound. ZnO is a white powder that is insoluble in water it is used as an additive in numerous materials and products including cosmetics, food supplements, rubbers, plastics, ceramics, glass, cement, lubricants, paints, ointments, adhesives, sealants, pigments, foods, batteries, ferrites, fire retardants, and first aid tapes. Although it occurs naturally as the mineral zincite, most ZnO is produced synthetically.

$TiO_2$ is the formula for titanium dioxide, also called titania. $TiO_2$ is a white, opaque, naturally occurring mineral existing in a number of crystalline forms, the most important of Inch are rutile and anatase. These naturally occurring oxide forms can be mined and serve as a source for commercial titanium. $TiO_2$ is odorless and absorbent. $TiO_2$ protects from ultraviolet radiation because of its propel y to absorb ultraviolet light. The photocatalytic activity of $TiO_2$ results in thin coatings exhibiting self-cleaning and disinfecting properties under exposure to ultraviolet radiation. Alloys are characterized by being lightweight and having very high tensile strength (even at high temperatures), high corrosion resistance, and an ability to withstand extreme temperatures, and thus are used principally in aircraft, pipes for power plants, armorplating, naval ships, spacecraft, and missiles.

CaO is the formula for calcium oxide, commonly known as quicklime or burnt lime, a widely used chemical compound. It is a white, caustic, alkaline, crystalline solid at room temperature. The broadly used term "lime" connotes calcium-containing inorganic materials, in which carbonates, oxides, and hydroxides of calcium, silicon, magnesium, aluminum, and iron predominate. By contrast, quicklime specifically applies to the single chemical compound CaO. CaO that survives processing without reacting in building products such as cement is ailed free lime. Quicklime is relatively inexpensive. Both it and a chemical derivative (calcium hydroxide, of Inch quicklime is the base anhydride) are important commodity chemicals.

Replacing these powders with fly ash represents an available and sustainable alternative; fly ash has a large specific surface, and, according to the coal and burning conditions, it may have variable composition; usually, fly ash has a negative surface charge due to the predominant oxidic composition. A significant problem is that the ionic fly ash surface has a high wetting behavior, while rubber (and plastics) is hydrophobic, with very low surface charge. Therefore, building up interfaces based on electrostatic attraction is highly unlikely and thermal linking should be considered. The thermal process must be well controlled, targeting strong interfaces (visco-elastic regimen) without decomposing the polymeric compounds.

Fly Ash (Type F) mainly consisted of SiO2 (51.4%) Al2O3 (22.4%), and Fe2O3 (10.86%), with a total percentage over 70%, therefore, according to the ASTM standards, the fly ash is of type F. The unburned carbon (loss of ignition) amounts to 3.6%. The fly ash should have an activated nano-surface (by alkali treatment) in order to develop uniform interfaces, with significant effect on the compression resistance and on impact. The effect of fly ash addition is correlated with the surface energy, targeting further applications.

Class F provides strength and lessens permeability I the long run. ASTM standard C618 provides information on the physical, chemical, and mechanical properties of the fly ash classes. Applications include PVC pipe, recycled plastic lumber, and binding agents and fillers in plastic products.

For reproducible composites obtained by embedding the inorganic powder in the organic polymer matrix, fly ash should have a constant surface property. Yet, the fly ash composition, crystalline structure and surface morphology significantly depend on the coal batch. Therefore, a conditioning process was applied for leveling these properties. The fly ash was washed under stirring for 24 hours in alkali solution (NaOH 2mo VL). During this process some oxides are removed (e.g. sodium and potassium oxides) and other oxides undergo a solubilization/reprecipitation process as $SiO_2$ does. The fly ash with conditioned surface was dried at 120° C. for two hours, sieved, and the fraction with average diameters between 100 and 200 μm was selected for composite preparation.

TABLE 3

Properties

| Izod Impact Strength ft · lb/in | | Flexural Properties | | Flexural Modulus, psi | Flexural Strength @ 5%, psi |
|---|---|---|---|---|---|
| 1 | 3.39 | 1 | | 148160 | 3931 |
| 2 | 3.39 | 2 | | 151583 | 3914 |
| 3 | 3.56 | 3 | | 150931 | 3916 |
| 4 | 3.73 | 4 | | 147877 | 3915 |
| 5 | 3.39 | 5 | | 145137 | 3899 |
| 6 | 3.56 | Average | | 148738 | 3915 |
| 7 | 3.05 | Std. Dev. | | 11.6 | 11.6 |
| 8 | 3.56 | | | | |
| 9 | 3.73 | | | | |
| 10 | 3.22 | | | | |
| Average | 3.46 | | | | |
| Std. Dev. | 0.22 | | | | |

| Tensile Properties | Tensile Strength @ Break, psi | Tensile Elongation @ Break, % | Tensile Strength @ Yield, psi | Tensile Elongation @ Yield, % |
|---|---|---|---|---|
| 1 | 2119 | 62.0 | 2558 | 3.54 |
| 2 | 2241 | 24.8 | 2549 | 3.45 |
| 3 | 2159 | 36.9 | 2541 | 3.88 |
| 4 | 2096 | 72.4 | 2576 | 3.71 |
| 5 | 2133 | 47.9 | 2549 | 3.80 |
| Average | 2150 | 48.8 | 2555 | 3.68 |
| Std. Dev. | 56 | 19.1 | 13 | 0.18 |

| Compressive Strength @ Yield | | Heat Deflection Temperatures, ° C. | Melt Flow Rate, g/10 min | Density, g/cm³ |
|---|---|---|---|---|
| 1 | 3884 | 1        95.5 | 0.955 | 7.954 |
| 2 | 3847 | 2        95.6 | 0.955 | 8.232 |
| 3 | 3848 | Average  95.6 | 0.955 | 8.09 |
| 4 | 3814 | | | |
| 5 | 3824 | | | |
| Average | 3843 | | | |
| Std. Dev. | 27 | | | |

Formulations may be further modified to include impact modifiers, fillers (also known as extenders), chemical rubber modifiers, e.g., to influence hardness, flexibility, friction characteristics, and bonding ability (for e.g., bonding to fiberglass reinforcement).

The above formulations and method 100 may be employed to produce many different products by injection molding. These products may include by way of non-limiting examples, roofing materials, building siding, flooring, fencing, below grade drain conduit and conduit components and accessories, in-ground support posts and poles, doors, furniture, storage and transport containers, motor vehicle parts, boats, recreational equipment such as skateboards, and ground mounted surfacing (e.g., tiles, also known as pavers).

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A method of injection molding a product, using an injection nozzle having an orifice transverse dimension, and using a constituent injection material comprising waste rubber particles and waste plastic matrix material that minimizes the generation of volatile organic compounds, the method comprising:
    comminuting waste rubber into solid particles of dimensions sufficiently small to pass through the injection nozzle;
    melting waste plastic comprising at least one of high density polyethylene, polyethylene terephthalate, and polypropylene;
    once the waste plastic is melted, adding the comminuted solid waste rubber to the melted waste plastic, thereby minimizing the time that the waste rubber is exposed to high temperatures and generation of volatile organic compounds;
    blending the comminuted waste rubber with the melted waste plastic;
    maintaining temperatures greater than a maximum melting point temperature of the waste plastic, whereby the waste rubber remains in a solid state; and
    injecting the blended solid waste rubber and the melted waste plastic into an injection mold, wherein the resulting molded product is a homogeneous mixture of the waste plastic and the waste rubber, and wherein the time that the waste rubber is exposed to high temperatures and the generation of volatile organic compounds is minimized.

2. The method of claim 1, further comprising limiting a proportion of the constituent injection material to waste rubber in a range of twenty to eighty percent by weight, with a remainder of the constituent injection material being the waste plastic.

3. The method of claim 1, wherein the step of blending the comminuted waste rubber with the melted plastic, further comprises the step of blending in less than 2% Type F fly ash.

4. The method of claim 3, wherein Type F fly ash has an average diameter between 100 and 200 μm.

5. The method of claim 4, wherein the fly ash meets ASTM standard C618.

6. The method of claim 1, wherein the waste rubber comprises wheeled transport vehicle tire waste and ethylene propylene terpolymer rubber.

7. The method of claim 1, further comprising obtaining the waste plastic from discarded consumer articles, and comminuting the discarded consumer articles.

8. A composition for a pellet of a constituent injection material comprising waste rubber particles and waste plastic matrix material, the composition comprising waste rubber particles;

less than 2% Type F fly ash; and waste plastic comprising at least one of high density polyethylene, polyethylene terephthalate, and polypropylene, wherein the waste rubber is blended with and encapsulated within the waste plastic, wherein the waste plastic has been melted prior to adding the waste rubber particles in order to minimize their time that the waste rubber is exposed to high temperatures and the generation of volatile organic compounds, and in order for the melted waste plastic to blend with and encapsulate the waste rubber particles, cooled, and formed into pellets, wherein the resulting pellets are a homogeneous mixture of the waste plastic and the waste rubber, wherein the time that the waste rubber is exposed to high temperatures and the generation of volatile organic compound is minimized, and wherein melting temperatures have been maintained above a maximum melting point temperature of the waste plastic, whereby the waste rubber remains within the waste plastic as discrete particles encapsulated in a plastic matrix material.

9. The composition of claim 8, wherein the Type F fly ash has an average diameter between 100 and 200 μm.

* * * * *